US012788668B2

(12) United States Patent
Fuwei

(10) Patent No.: US 12,788,668 B2
(45) Date of Patent: Nov. 10, 2026

(54) MOBILITY AIDS AND BRAKING MECHANISMS THEREOF

(71) Applicant: Medical Depot, Inc., Port Washington, NY (US)

(72) Inventor: Xie Fuwei, Zhenjiang (CN)

(73) Assignee: Medical Depot, Inc., Port Washington, NY (US)

( * ) Notice: Subject to any disclaimer, the term of this patent is extended or adjusted under 35 U.S.C. 154(b) by 251 days.

(21) Appl. No.: 18/735,319

(22) Filed: Jun. 6, 2024

(65) Prior Publication Data

US 2025/0375340 A1 Dec. 11, 2025

(51) Int. Cl.

| | |
|---|---|
| ***A61H 3/04*** | (2006.01) |
| ***F16C 1/10*** | (2006.01) |
| ***F16C 1/12*** | (2006.01) |
| ***F16D 65/28*** | (2006.01) |
| *F16D 121/16* | (2012.01) |

(52) U.S. Cl.

CPC ............... *A61H 3/04* (2013.01); *F16C 1/106* (2013.01); *F16C 1/12* (2013.01); *F16D 65/28* (2013.01); *A61H 2003/046* (2013.01); *A61H 2201/1635* (2013.01); *F16D 2121/16* (2013.01)

(58) Field of Classification Search

CPC ........ A61H 2003/007; A61H 2003/004; A61H 2003/001; A61H 2003/046; F16C 1/106

See application file for complete search history.

(56) References Cited

U.S. PATENT DOCUMENTS 5,431,255 A * 7/1995 Tsuchie ..................... B61L 3/08 188/24.12
5,538,268 A * 7/1996 Miller ..................... A61H 3/04 482/68
6,212,969 B1 4/2001 Kuo
6,338,355 B1 * 1/2002 Cheng ..................... A61H 3/04 482/68
6,378,663 B1 * 4/2002 Lee ..................... A61H 3/04 188/19
7,484,740 B2 * 2/2009 Miller ..................... A61H 3/04 135/65
8,998,223 B2 * 4/2015 Chang ..................... B60T 7/102 280/87.021
9,241,864 B2 * 1/2016 Miller ..................... A61H 3/04
11,559,459 B2 1/2023 Whitmore et al.
2010/0313924 A1 * 12/2010 Cho ..................... A45B 1/02 135/85
2019/0240106 A1 * 8/2019 Kapec ..................... A61H 3/04

FOREIGN PATENT DOCUMENTS

FR 907754 A * 3/1946

OTHER PUBLICATIONS

FR-907754-A Translation (Year: 1946).*

* cited by examiner

*Primary Examiner* — James A Shriver, II
*Assistant Examiner* — Mohammad Omid Neyzari
(74) *Attorney, Agent, or Firm* — Bradley J. Shelowitz

(57) ABSTRACT

A braking mechanism of a mobility aid includes a pair of brake handles, a pair of brake cables, and a pair of brakes. The brakes are in a normally braked state with wheels of a mobility aid until a user manually actuates one or both brake handles. The pair of brake cables are coupled to one another such that each of the brake cables are actuated simultaneously by a single-handed actuation of one of the pair of brake handles.

13 Claims, 3 Drawing Sheets

MOBILITY AIDS AND BRAKING MECHANISMS THEREOF

BACKGROUND

Technical Field

The present disclosure relates to mobility aids, and more particularly, to braking mechanisms for a mobility aid.

Background of Related Art

Rollators facilitate an individual's ability to walk and be independently mobile by providing stabilization, support, and/or reducing the burden on the individual's lower body. A typical rollator includes a frame supported on three to four wheels, handlebars, and a seat. The rollator further includes a user-controlled means for braking or slowing down movement of the rollator.

SUMMARY

In accordance with an aspect of the present disclosure, a mobility aid is provided and includes a left-side frame, a right-side frame coupled to the left-side frame, a plurality of wheels supporting the left-side and right-side frames, a left-side frame, and a braking mechanism. The braking mechanism includes a first brake handle positioned adjacent the left-side frame, a second brake handle positioned adjacent the right-side frame, a first cable, a second cable, a housing, and a connector. Each of the first and second cables has a first end portion, a second end portion, and a middle portion. The first end portion of the first cable is coupled to the first brake handle, and the first end portion of the second cable is coupled to the second brake handle. The connector is slidably supported in the housing and fixedly coupled to the middle portion of each of the first and second cables such that the middle portion of one of the first or second cables moving in a first direction results in the middle portion of the other of the first or second cables moving in the first direction.

In aspects, the mobility aid may further include a first brake coupled to the second end portion of the first cable and positioned adjacent a first wheel of the plurality of wheels, and a second brake coupled to the second end portion of the second cable and positioned adjacent a second wheel of the plurality of wheels.

In aspects, the first brake and the second brake may be configured to be actuated simultaneously by an actuation of one of the first brake handle or the second brake handle.

In aspects, the first brake may be engaged with the first wheel and the second brake may be engaged with the second wheel when the first and second brake handles are each in an unactuated state. The actuation of one of the first brake handle or the second brake handle may simultaneously disengage both the first and second brakes from the first and second wheels.

In aspects, the braking mechanism may further include first, second, third, and fourth pulleys. The first and second pulleys may be positioned at respective first and second corners of the housing, and the third and fourth pulleys may be positioned at respective third and fourth corners of the housing. The first cable may extend around the first and second pulleys, and the second cable may extend around the third and fourth pulleys.

In aspects, each of the first, second, third, and fourth corners of the housing may define an opening therethrough. The first end portion of the first cable may extend through the opening in the first corner, the second end portion of the first cable may extend through the opening in the second corner, the first end portion of the second cable may extend through the opening in the third corner, and the second end portion of the second cable may extend through the opening in the fourth corner.

In aspects, the openings in the first and third corners may cooperatively define a first axis, and the openings in the second and fourth corners may cooperatively define a second axis that is parallel with the first axis.

In aspects, the middle portion of the first and second cables may be perpendicular to the first and second end portions of the first and second cables.

In aspects, the housing and the middle portion of each of the first and second cables may be supported in a position between the left-side and right-side frames.

In accordance with another aspect of the present disclosure, a braking mechanism for braking a mobility aid is provided and includes a first brake handle, a second brake handle, a first cable, a second cable, a first brake, a second brake, a housing, and a sliding block slidably supported in an inner chamber defined by the housing. Each of the first and second cables has a first end portion, a second end portion, and a middle portion. The first end portion of the first cable is coupled to the first brake handle, and the first end portion of the first cable is coupled to the second brake handle. The first brake is coupled to the second end portion of the first cable and configured to be positioned adjacent a first wheel of a mobility aid, and the second brake is coupled to the second end portion of the second cable and configured to be positioned adjacent a second wheel of the mobility aid. The sliding block is fixedly coupled to the middle portion of each of the first and second cables such that an actuation of one of the first or second cables moves the sliding block in a first direction, whereby the sliding block simultaneously moves the middle portion of the first cable in the first direction and the middle portion of the second cable in the first direction.

As used herein, the terms parallel and perpendicular are understood to include relative configurations that are substantially parallel and substantially perpendicular up to about + or −15 degrees from true parallel and true perpendicular.

As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

BRIEF DESCRIPTION OF THE DRAWINGS

Embodiments of the present disclosure are described herein with reference to the accompanying drawings, wherein.

DETAILED DESCRIPTION

Figure 1:
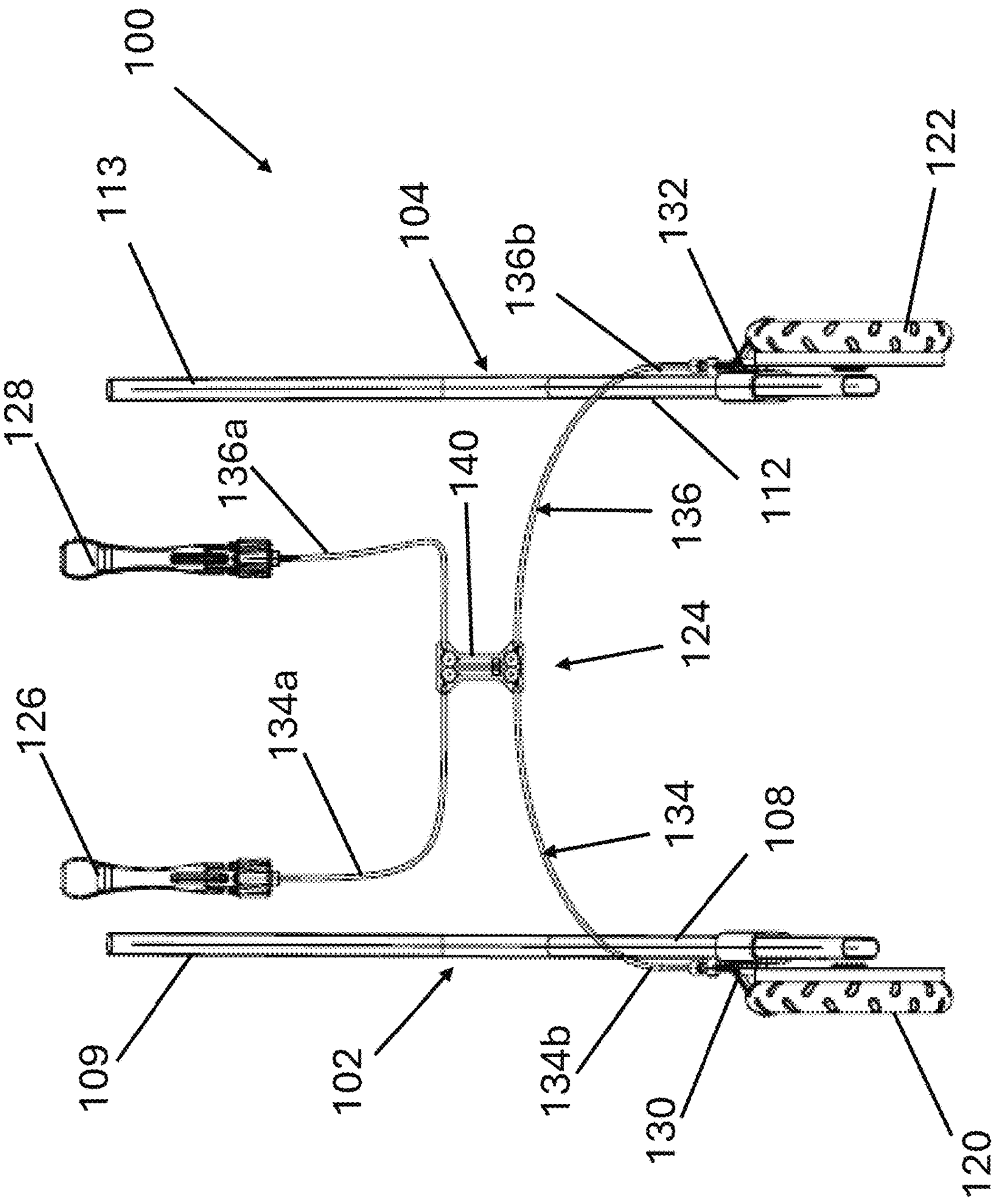
FIG. 1 is a rear view illustrating an exemplary embodiment of selected components of a rollator including a braking mechanism.

Embodiments of the presently disclosed mobility aids and braking mechanism thereof are described in detail with reference to the drawings, in which like reference numerals designate identical or corresponding elements in each of the several views.

Figure 2:
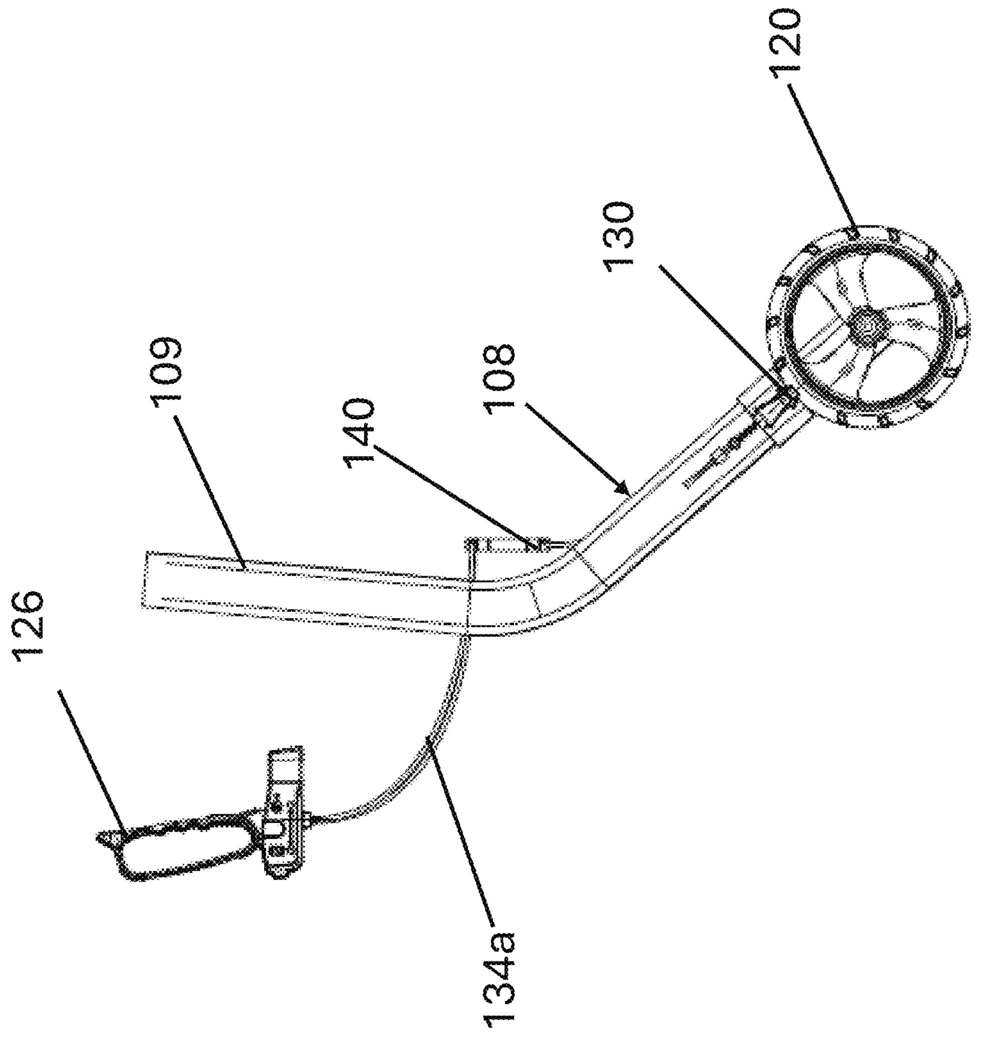
FIG. 2 is a side view illustrating the rollator with braking mechanism of FIG. 1.

With reference to FIGS. 1 and 2, an exemplary embodiment of a mobility aid 100 is shown. While the mobility aid 100 illustrated in the figures is a rollator, it is contemplated that the mobility aid 100 may be any suitable type such as a wheelchair, a standard walker, an upright walker, or the like. The mobility aid 100 generally includes a left-side frame 102, and a right-side frame 104 coupled to the left-side frame 102 by a folding mechanism (not explicitly shown) that selectively transitions the mobility aid 100 between an expanded or operational configuration (FIG. 1) and a collapsed or stored configuration (not shown). Each of the left-side and right-side frames 102, 104 includes a respective rear leg 108, 112, and a front leg (not explicitly shown). The rear legs 108, 112 may have an upright support 109, 113 extending upwardly therefrom. The left and right upright supports 109, 113 may be monolithically formed with or connected (e.g., welded) to the remainder of the rear leg 108, 112. A lower end of each of the rear legs 108, 112 has a wheel 120, 122 coupled thereto.

For further details regarding the components of the rollator 100, reference may be made to U.S. patent application Ser. No. 17/176,590, filed on Feb. 16, 2021 (now U.S. Pat. No. 11,559,459), the entire contents of which are incorporated by reference herein.

The mobility aid 100 further includes a braking mechanism 124 supported between the left-side frame 102 and the right-side frame 104. For example, the braking mechanism 124 may be supported at a rear end of the folding mechanism. Other suitable locations for supporting the components of the braking mechanism 124 are also contemplated. The braking mechanism 124 generally includes a first brake handle 126 positioned adjacent the left-side frame 102 (e.g., coupled to the left upright support 109), a second brake handle 128 positioned adjacent the right-side frame 104 (e.g., coupled to the right upright support 113), a first brake 130, a second brake 132, a first cable 134 operably coupled between the first brake handle 126 and the first brake 130, and a second cable 136 operably coupled between the second brake handle 128 and the second brake 132.

The first brake 130 is positioned adjacent a first wheel of the mobility aid 100, such as, for example, the left rear wheel 120, and the second brake 132 is positioned adjacent a second wheel of the mobility aid 100, such as, for example, the right rear wheel 122 of the mobility aid 100. It is contemplated that the first and second brakes 130, 132 may be positioned adjacent any of the wheels of the mobility aid 100. The brakes 130, 132 may be any suitable brakes that slow or stop rotation of the wheels 120, 122 when the brakes 130, 132 are engaged with the wheels 120, 122 with a threshold amount of frictional force. For example, the brakes 130, 132 may be brake pads of the types described in U.S. patent application Ser. No. 17/176,590, filed on Feb. 16, 2021 (now U.S. Pat. No. 11,559,459), incorporated by reference above. In addition, the brakes 130, 132 may be configured to engage an outer wall of the tire of the wheels 120, 122 by way of a pushing motion, or an inner rim of the wheels 120, 122 by way of a pulling motion.

The first and second brakes 130, 132 are operably coupled to the respective first and second brake handles 126, 128 such that the first and second brakes 130, 132 are normally engaged with the first and second wheels 120, 122 to prevent or resist rotation of the wheels 120, 122 of the mobility aid 100 until a user manually actuates the brake handles 126, 128 to release the first and second brakes 130, 132 from the wheels 120, 122. Stated differently, the braking mechanism 124 of the present disclosure functions as a "dead man's" brake that requires constant actuation of one of the brake handles 126, 128 by the user to free up the mobility aid 100 for rolling. For example, a biasing member (not labeled) may be coupled to each of the brakes 130, 132 that normally biases the brakes 130, 132 in a downward direction into engagement with the wheels 120, 122, whereby an actuation of the brake handles 126, 128 pulls the brakes 130, 132 in an upward direction and out of engagement with the wheels 120, 122. In other aspects, the biasing members may bias the brakes 130, 132 in an upward direction to maintain pivotable brakes 130, 132 in engagement with the wheels 120, 122.

Figure 3:
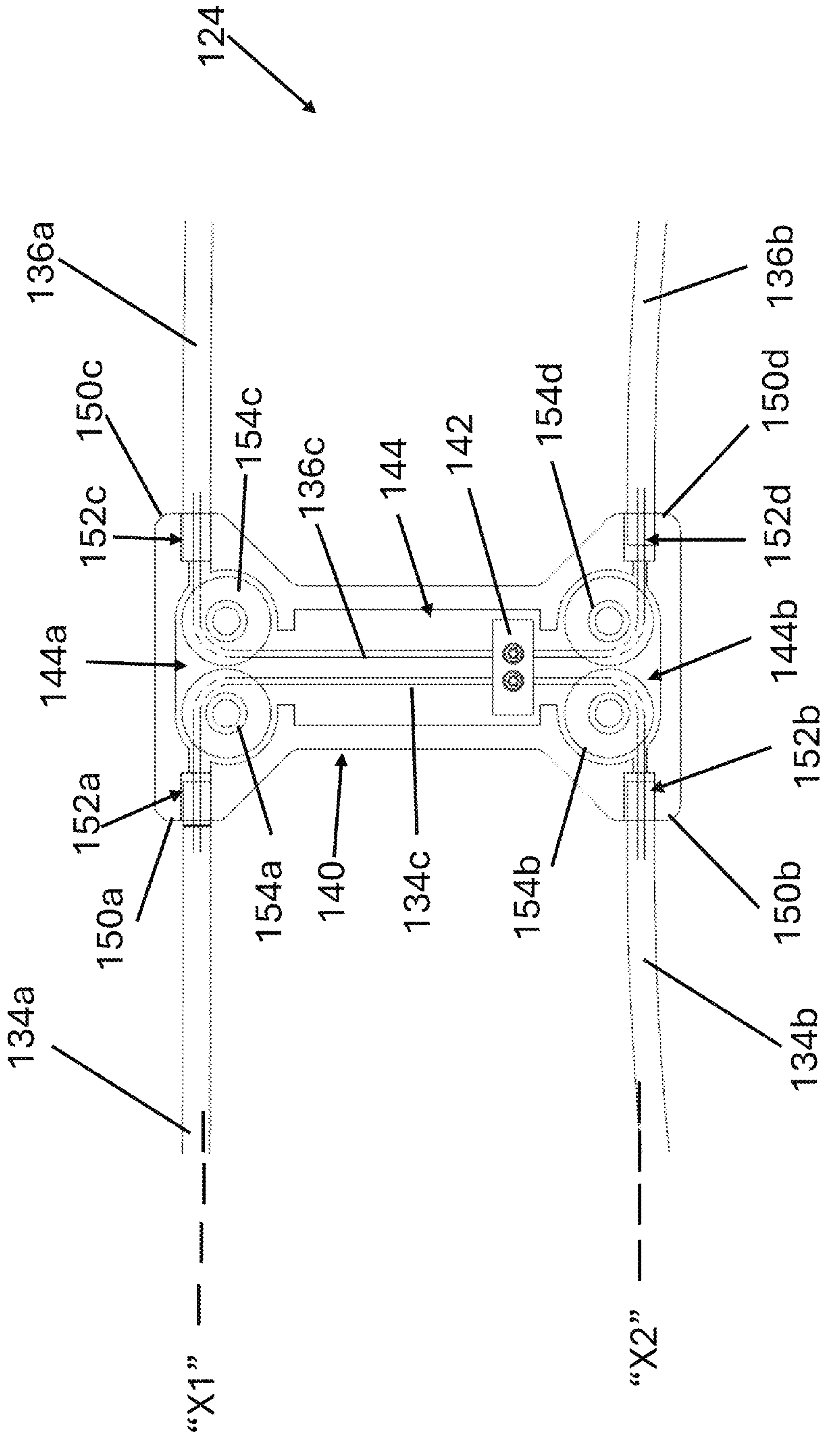
FIG. 3 is a rear, enlarged view illustrating the braking mechanism of the rollator of FIG. 1.

The first cable 134 has a first end portion 134*a* coupled to the first brake handle 126, a second end portion 134*b* coupled to the first brake 130, and a middle portion 134*c* (FIG. 3) extending therebetween. Similarly, the second cable 136 has a first end portion 136*a* coupled to the second brake handle 128, a second end portion 136*b* coupled to the second brake 132, and a middle portion 136*c* extending therebetween. The braking mechanism 124 further includes a housing 140, and a connector, such as, for example, a sliding block 142, slidably supported in an inner chamber 144 of the housing 140. The housing 140 may be secured to any suitable location of the mobility aid 100, such as, for example, a rear side of the folding mechanism.

The inner chamber 144 of the housing 140 has a middle portion, an upper portion 144*a*, and a lower portion 144*b*. The sliding block 142 is slidably positioned in the middle portion of the inner chamber 144 and fixedly coupled to the middle portion 134*c*, 136*c* of each of the first and second cables 134, 136 such that the middle portion 134*c*, 136*c* of one of the first or second cables 134, 136 moving in a first direction results in the middle portion 134*c*, 136*c* of the other of the first or second cables 134, 136 moving in the first direction. The sliding block 142 may be secured to the middle portions 134*c*, 136*c* via any suitable fastening engagement, such as, for example, clips, screws, bolts, adhesives, or the like. The middle portion of the inner chamber 144 may be rectangular in shape and the sliding block 142 may be keyed to the middle portion of the inner chamber 144 to prevent rotation of the sliding block 142 and only permit vertical movement of the sliding block 142 within the housing 140.

The housing 140 has four corners 150*a*, 150*b*, 150*c*, 150*d* and openings 152*a*, 152*b*, 152*c*, 152*d* defined adjacent a respective corner 150*a*, 150*b*, 150*c*, 150*d*. The braking mechanism 124 further includes first and second pulleys 154*a*, 154*b* positioned at respective first and second corners 150*a*, 150*b* of the housing 140, and third and fourth pulleys 154*c*, 154*d* positioned at respective third and fourth corners 150*c*, 150*d* of the housing 140. The first cable 134 extends around the first and second pulleys 154*a*, 154*b*, and the second cable 136 extends around the third and fourth pulleys 154*c*, 154*d*. The first end portion 134*a* of the first cable 134 extends through the opening 152*a* in the first corner 150*a*, and the second end portion 134*b* of the first cable 134 extends through the opening 152*b* in the second corner 150*b*. The first end portion 136*a* of the second cable 136 extends through the opening 152*c* in the third corner 150*c*, and the second end portion 136*b* of the second cable 136 extends through the opening 152*d* in the fourth corner 150*d*. The openings 152*a*, 152*c* in the first and third corners 150*a*, 15*c* of the housing 140 cooperatively define a first axis "X1", and the openings 152*b*, 152*d* in the second and fourth corners 150*b*, 150*d* of the housing 140 cooperatively define a second axis "X2" that is parallel with the first axis "X1."

The middle portion 134*c*, 136*c* of the first and second cables 134, 136 are perpendicular to the first and second end portions 134*a*, 134*b* of the first cable 134 and the first and second end portions 136*a*, 136*b* of the second cable 136.

In operation, when the first and second brake handles 126, 128 are each in an unactuated or normal state, the brakes 130, 132 are engaged with the respective wheels 120, 122 of the mobility aid 100, whereby movement of the mobility aid 100 along a ground surface is resisted or prevented. To unlock the wheels 120, 122, and therefore permit movement of the mobility aid 100 along the ground surface, a user may manually actuate one or both of the brake handles 126, 128 to release both of the brakes 120, 122. For example, when a user actuates only the first brake handle 126, the first cable 134 is moved in a first direction (e.g., upwardly relative to the housing 140). Since the middle portion 136*c* of the second cable 136 is fixed relative to the middle portion 134*c* of the first cable 134 via the sliding block 142, the second cable 136 moves in the first direction in response to the movement of the first cable 134 in the first direction. Accordingly, the single actuation of the first brake handle 126 simultaneously disengages both the first and second brakes 130, 132 from the first and second wheels 120, 122. Upon releasing the first brake handle 126, the biasing members of the braking mechanism 124 return the first and second brakes 130, 132 to the engaged position with the first and second wheels 120, 122 to limit movement of the mobility aid 100.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:

1. A mobility aid, comprising:
- a left-side frame;
- a right-side frame coupled to the left-side frame;
- a plurality of wheels supporting the left-side and right-side frames; and
- a braking mechanism including:
  - a first brake handle positioned adjacent the left-side frame;
  - a second brake handle positioned adjacent the right-side frame;
  - a first cable having a first end portion coupled to the first brake handle, a second end portion, and a middle portion;
  - a second cable having a first end portion coupled to the second brake handle, a second end portion, and a middle portion;
  - a housing;
  - a connector slidably supported in the housing and fixedly coupled to the middle portion of each of the first and second cables such that the middle portion of one of the first or second cables moving in a first direction results in the middle portion of the other of the first or second cables moving in the first direction;
  - first and second pulleys positioned at respective first and second corners of the housing, the first cable extending around the first and second pulleys; and
  - third and fourth pulleys positioned at respective third and fourth corners of the housing, the second cable extending around the third and fourth pulleys.

2. The mobility aid according to claim 1, further comprising:
- a first brake coupled to the second end portion of the first cable and positioned adjacent a first wheel of the plurality of wheels; and
- a second brake coupled to the second end portion of the second cable and positioned adjacent a second wheel of the plurality of wheels.

3. The mobility aid according to claim 2, wherein the first brake and the second brake are configured to be actuated simultaneously by an actuation of one of the first brake handle or the second brake handle.

4. The mobility aid according to claim 3, wherein the first brake is engaged with the first wheel and the second brake is engaged with the second wheel when the first and second brake handles are each in an unactuated state, and the actuation of one of the first brake handle or the second brake handle simultaneously disengages both the first and second brakes from the first and second wheels.

5. The mobility aid according to claim 1, wherein each of the first, second, third, and fourth corners of the housing defines an opening therethrough, the first end portion of the first cable extending through the opening in the first corner, the second end portion of the first cable extending through the opening in the second corner, the first end portion of the second cable extending through the opening in the third corner, and the second end portion of the second cable extending through the opening in the fourth corner.

6. The mobility aid according to claim 5, wherein the openings in the first and third corners cooperatively define a first axis, and the openings in the second and fourth corners cooperatively define a second axis that is parallel with the first axis.

7. The mobility aid according to claim 6, wherein the middle portion of the first and second cables is perpendicular to the first and second end portions of the first and second cables.

8. The mobility aid according to claim 1, wherein the middle portion of the first and second cables is perpendicular to the first and second end portions of the first and second cables.

9. The mobility aid according to claim 8, wherein the housing and the middle portion of each of the first and second cables are supported in a position between the left-side and right-side frames.

10. A braking mechanism for braking a mobility aid, the braking mechanism comprising:
- a first brake handle;
- a second brake handle;
- a first cable having a first end portion coupled to the first brake handle, a second end portion, and a middle portion;
- a second cable having a first end portion coupled to the second brake handle, a second end portion, and a middle portion;
- a first brake coupled to the second end portion of the first cable and configured to be positioned adjacent a first wheel of a mobility aid;
- a second brake coupled to the second end portion of the second cable and configured to be positioned adjacent a second wheel of the mobility aid;
- a housing defining an inner chamber; and
- a sliding block slidably supported in the inner chamber of the housing and fixedly coupled to the middle portion of each of the first and second cables such that an actuation of one of the first or second cables moves the sliding block in a first direction, whereby the sliding block simultaneously moves the middle portion of the first cable in the first direction and the middle portion of the second cable in the first direction, wherein the middle portion of the first and second cables is perpendicular to the first and second end portions of the first and second cables.

11. The braking mechanism according to claim 10, further comprising:

first and second pulleys positioned at respective first and second corners of the housing, the first cable extending around the first and second pulleys; and third and fourth pulleys positioned at respective third and fourth corners of the housing, the second cable extending around the third and fourth pulleys.

12. The braking mechanism according to claim 11, wherein each of the first, second, third, and fourth corners of the housing defines an opening therethrough, the first end portion of the first cable extending through the opening in the first corner, the second end portion of the first cable extending through the opening in the second corner, the first end portion of the second cable extending through the opening in the third corner, and the second end portion of the second cable extending through the opening in the fourth corner.

13. The braking mechanism according to claim 12, wherein the openings in the first and third corners cooperatively define a first axis, and the openings in the second and fourth corners cooperatively define a second axis that is parallel with the first axis.

* * * * *